T. E. BROWN, Jr.
BASCULE BRIDGE.
APPLICATION FILED AUG. 2, 1917.
1,254,773.
Patented Jan. 29, 1918.
4 SHEETS—SHEET 1.
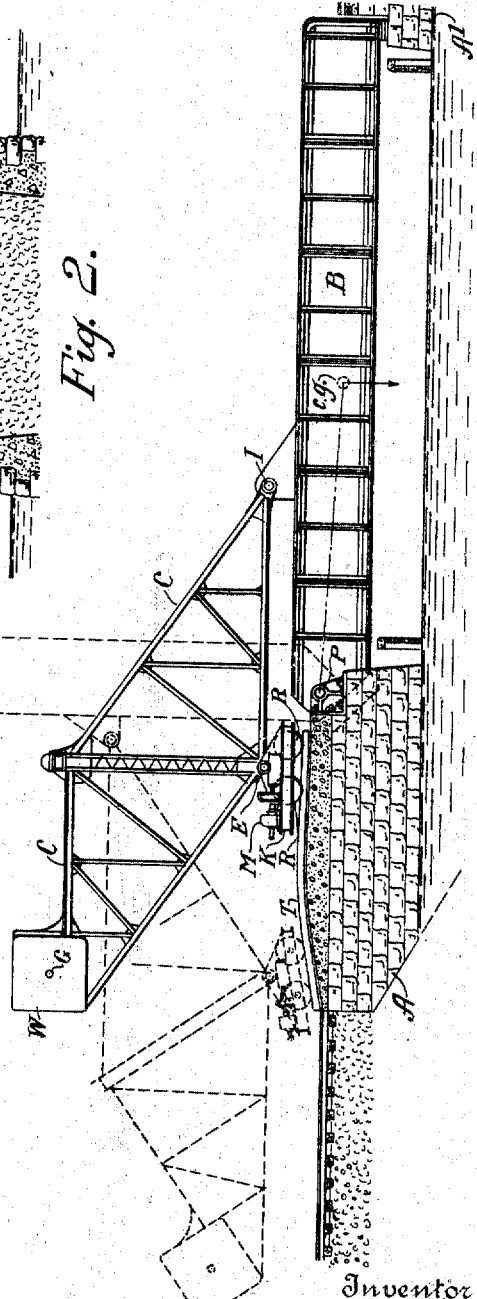
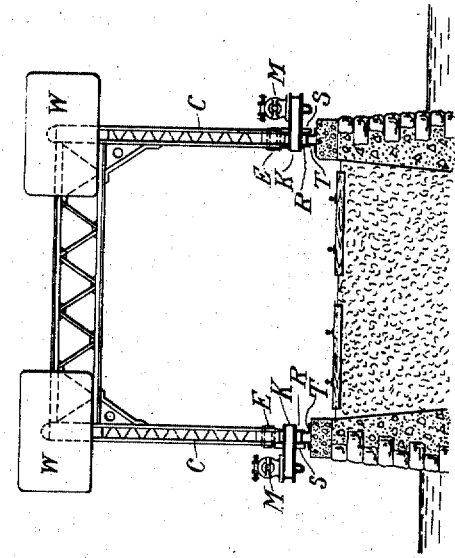
Inventor
Thomas Ellis Brown Jr.
By
Attorney T. E. BROWN, Jr.
BASCULE BRIDGE.
APPLICATION FILED AUG. 2, 1917.
1,254,773.
Patented Jan. 29, 1918.
4 SHEETS—SHEET 2.
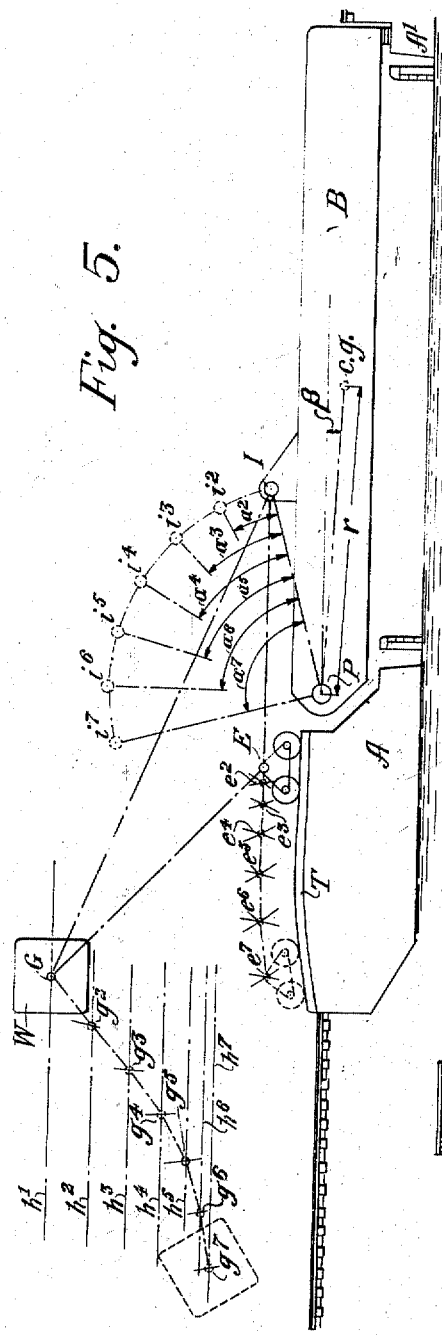
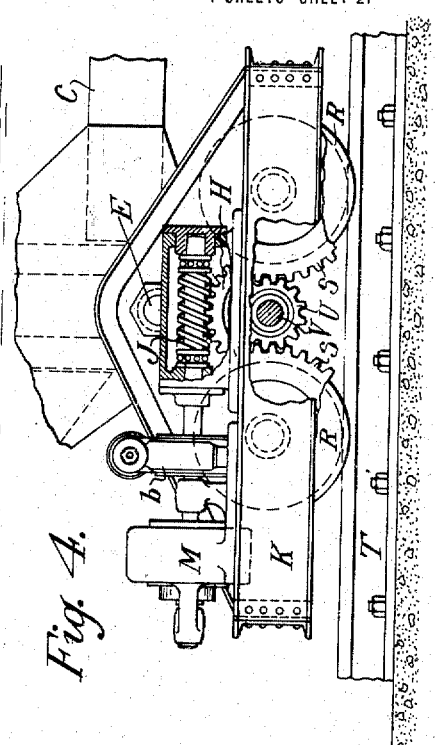
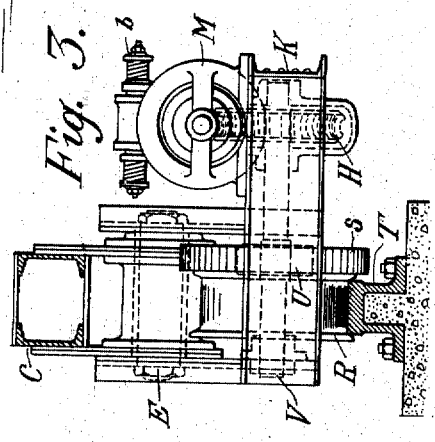
Inventor
Thomas Ellis Brown Jr.
By
Attorney

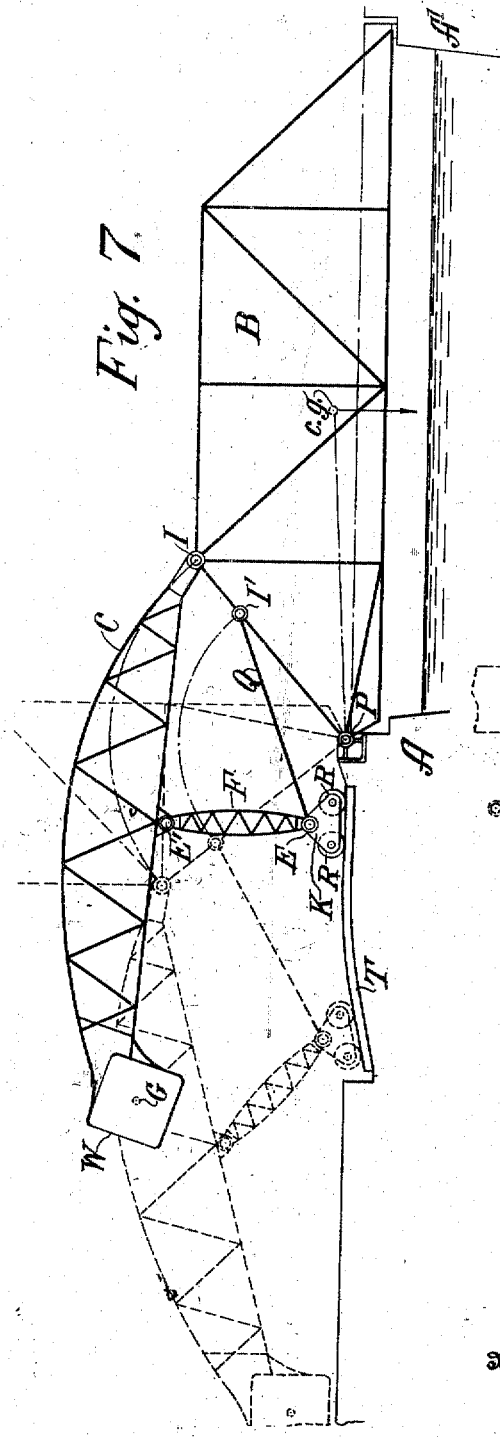
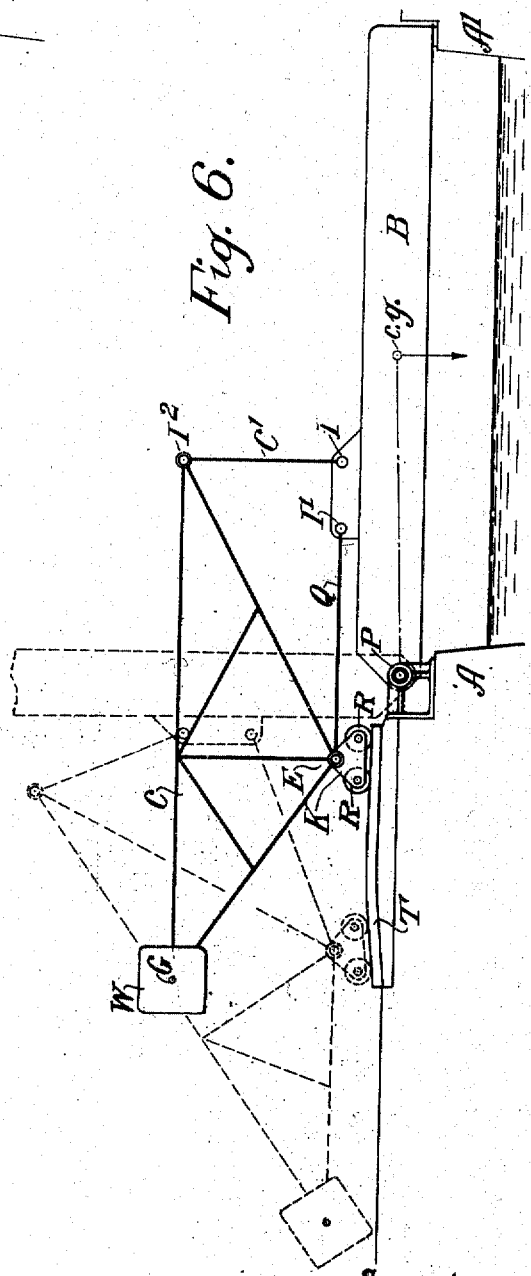

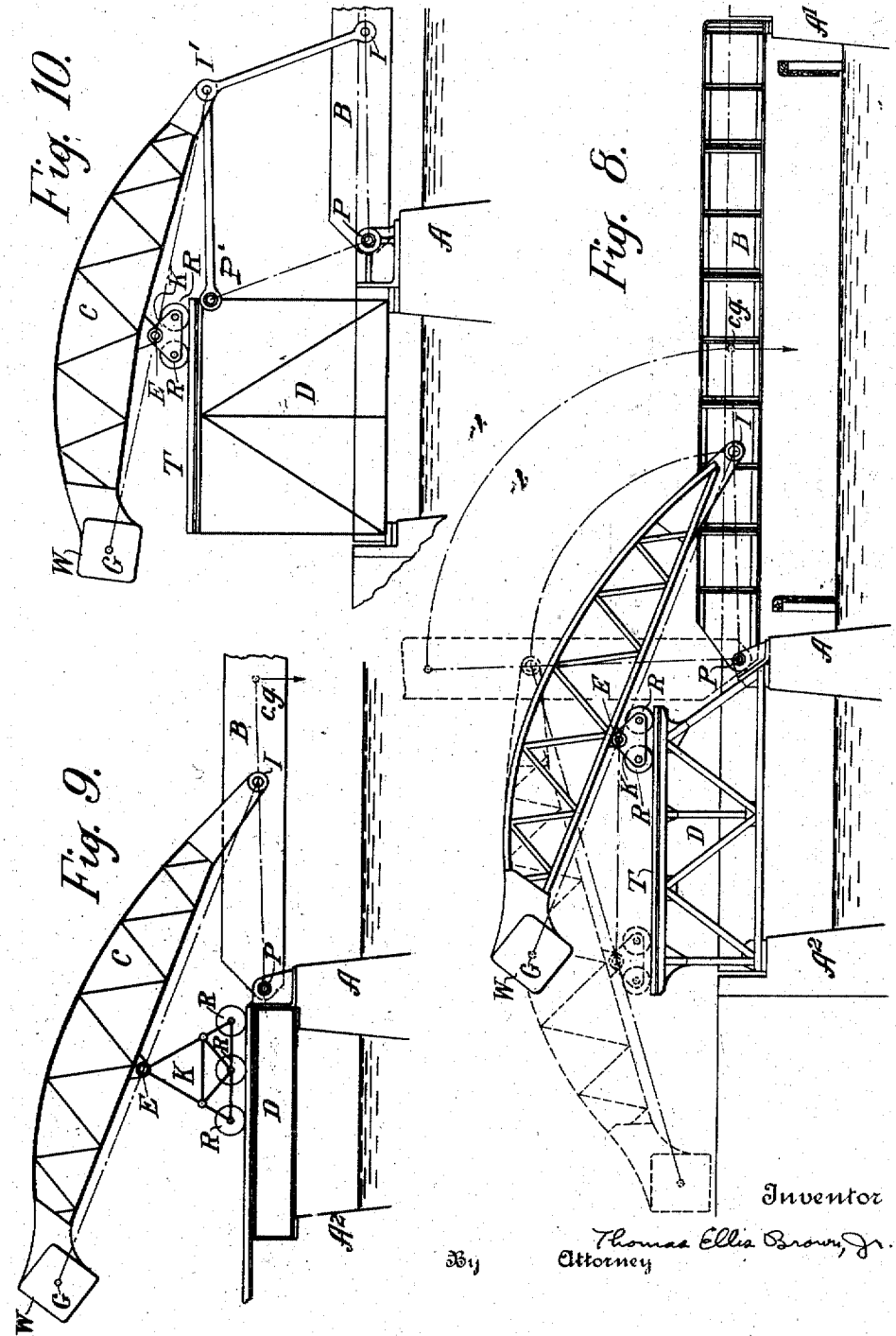

UNITED STATES PATENT OFFICE.

THOMAS ELLIS BROWN, JR., OF MORRISTOWN, NEW JERSEY.

BASCULE-BRIDGE.

1,254,773.   Specification of Letters Patent.   Patented Jan. 29, 1918.

Application filed August 2, 1917. Serial No. 184,128.

*To all whom it may concern:*

Be it known that I, THOMAS ELLIS BROWN, Jr., a citizen of the United States, and a resident of Morristown, in the county of Morris and State of New Jersey, have invented certain new and useful Improvements in Bascule-Bridges, of which the following is a specification.

This invention relates to improvements in bascule bridges. One of the objects of my invention is to balance the movable span of a bascule bridge in all its positions by means of a counterweight and a counterweight carrying structure adapted to travel backward and forward as the bridge opens and closes. Another object of my invention is to operate the movable span by moving the counterweight structure backward and forward, and still another object of my invention is to move said structure backward and forward by simple rotation of the wheels or rollers upon which it is mounted, whereby I am enabled to greatly simplify the operating machinery.

I accomplish these objects by carrying the counterweight on a suitable structure, such as a trussed frame girder or beam, adapted to travel backward and forward as the span opens and closes and pivotally connecting said structure to the moving span in a manner such that said traveling structure will have a definite position relatively to said span for every position of said span, the traveling structure being preferably mounted on rollers or trucks carried by suitable tracks.

Referring to the drawings which accompany the specification to aid the description, Figure 1 is a side view of a bridge of the preferred form of my construction.

Fig. 2 is an end view of Fig. 1.

Figs 3 and 4 are an end view and side view respectively, and on an enlarged scale, of the truck and operating mechanism.

Fig. 5 is a diagram of a method for laying out the profile of the track.

Figs. 6, 7, 8, 9 and 10 are side views of modified forms of my invention.

Similar letters of reference refer to similar parts in all the figures.

Referring to Fig. 1, B is a movable span, P the pivot hinge or trunnion about which it rotates, A, A' are abutments, the abutment A supporting the track T.

W is a counterweight, supported on the framed structure or girder C which is pivotally connected to the movable span at a suitable point I. Said structure or girder C is supported at the pivot E by the truck K which is provided with wheels or rollers R. Said truck K being free to move backward and forward on the track T as the span B opens and closes.

The position of the pivot E of said truck K by the construction shown is always at a constant distance, equal to length I, E, from the point of attachment I on the movable span. *c. g.* is the center of gravity of the movable span. G is the center of gravity of the weight W, and the arrangement is such that the weight W balances the span B in all its positions as is hereinafter explained. It will be understood that the description refers to one side of the bridge only and that the parts described will in general be duplicated on the other side of the bridge, as shown in Fig. 2, but the counterweight W may extend clear across the bridge if desired. The frame C and tracks T are preferably placed in the planes of the girders of the movable span.

The bridge may be operated in any suitable manner but I prefer to use gears S attached to the rollers R and meshing with a pinion U on the shaft V supported on the frame of truck K as shown in large scale in Figs. 3 and 4, said shaft V may be rotated in any suitable manner as by the worm wheel H and worm J and the motor M, all preferably mounted on and traveling with the truck K. A solenoid brake or other suitable brake *b* should be provided. Electric current for the operation and control of the motor M may be carried to the truck by trolley or flexible wires or in any other suitable manner. It will be readily understood that an internal combustion engine or other motive power may be used instead of the motor M.

When said rollers R are rotated in a direction the reverse of the hands of a clock the truck K travels backward together with the structure C and the span B opens and when the rollers R are rotated in the opposite direction the truck K and structure C travel forward and the span B closes.

It will be noted see Fig. 1, that the truck K is between the counterweight W and the pivot I of the moving span and therefore the load on the truck K is greater than the weight W, and hence there is sufficient pressure and adhesion between the rollers R and track T to provide for the required tractive force, and therefore simple rotation of the rollers R may be used to operate the bridge, and the operating struts, racks or gear segments usual with bascule bridges, though applicable, are not necessary with my construction.

Referring to Fig. 5, in order that the moving span will be balanced in all its positions the profile of the track T must be so shaped that the path of the pivot E of the counterweight supporting structure will be such that the vertical fall of the center of gravity G of the weight W will be always proportional to the vertical rise of the center of gravity $c.g.$ of the moving span, or algebraically expressed, if N is the ratio of the weight of the counterweight W to the weight of the moving span B then $$N = \frac{W}{B}$$

and if $h$ is the fall of the weight from its original position, $\beta$ = the angle of the line P, $c.g.$ with the horizontal for the lowest position of the span; $r$ = the radial distance from pivot P to the center of gravity $c.g.$; and $\alpha$ = the angle through which the bridge has moved; then to maintain the required balance $$h = \frac{r}{N} (\text{sine } (\alpha + \beta) \mp \text{sine } \beta)$$

the positive or negative signs depending on whether $c.g.$ is above or below the horizontal line through the pivot P of the movable span, when said span is in its lowest position.

The path of the pivot E may be determined analytically but this involves laborious computation and I prefer the following simple partially graphic method, shown in Fig. 5. Having determined the position of the center of gravity $c.g.$, i. e., the distance $r$ and the angle $\beta$ and having selected a suitable point for the connecting pivot I and having chosen a suitable position for the center of gravity G of the weight W which is usually dependent on the head room required over the roadway, I draw an arc from the pivot P as a center through the pivot I and of a length corresponding with the total angular movement of the span, I then divide this arc into a number of parts representing various angular movements of the span and obtain the points $i^2$, $i^3$, $i^4$, etc. I then determine the required fall $h$ of the center of gravity G of the weight W from its original position, corresponding to these angular movements of the span by means of the foregoing formula, and draw horizontal lines $h^2$, $h^3$, $h^4$, etc., at the distances so found below the original position $h'$ of said point G. I then, from the corresponding points $i^2$, $i^3$, $i^4$, etc., draw arcs of radius IG, intersecting the horizontal lines $h^2$, $h^3$, $h^4$, etc., and thus obtain points $g^2$, $g^3$, $g^4$ in the path of point G. I then swing arcs from the points $g^2$, $g^3$, $g^4$, etc., and from the points $i^2$, $i^3$, $i^4$, etc., of radius respectively equal to GE and IE, and the intersection of these arcs will be points $e^2$, $e^3$, $e^4$, etc., in the path of the pivot E. By drawing a line at a proper distance from the path of E thus found to suit the construction of the truck K, the profile of the track T is obtained.

Various modifications of my invention may be used to suit special conditions. Fig. 6 shows the counterweight frame C connected by pivot $I^2$ and link $C^1$ to the moving span instead of directly at pivot I. This construction enables cross bracing to be used between the counterweight frames on each side of the bridge for their entire length and above the line of roadway clearance.

Fig. 7 shows the counterweight girder C supported above the truck K by a hinged strut F, and this form is especially suitable for a through bridge with deep trusses.

In the forms shown in Figs. 6 and 7, the pivoted distance struts Q pivoted to the span B at suitable points $I^1$, are desirable, in order to locate the position of the trucks K relatively to the movable span to enable the profile of the track T to be easily determined and to insure stable equilibrium.

Figs. 8 and 9 show forms of my invention which are useful where approach spans D are used and particularly when it is desirable to use straight horizontal tracks. In these forms in order that the tracks may be horizontal the point of attachment I of the beam C to the moving span B should be on the line P—$c.g.$ joining the pivot P and the center of gravity $c.g.$ of the moving span, as explained in application Serial, No. 145,578, filed January 31st, 1917, and the pivot E of the truck K should be placed on the line I. G. and at a distance L from point I as given by the following equation $$L = \frac{NX}{N + \frac{r}{r'}}$$

in which
X equals the distance from I to G.
N equals the ratio of the weight of the counterweight to the weight of the movable span.
$r$ and $r'$ = the distances from pivot P to the center of gravity $c.g.$ and the pivot I respectively.

In Fig. 10, a construction is shown by which the line P. I. is transferred to an equivalent parallel line P'—I' by means of a parallel motion.

When a plate girder approach span D is used as shown in Fig. 9, the girder D may be made shallow and the truck may be extended upward to pivot E, thus forming a movable tower K.

In all of the forms shown in the figures any required number of wheels or rollers may be used to suit the loads to be carried and the operating mechanism may rotate one or more or all of the wheels as may be necessary to produce the required traction. In light bridges a single roller may be used instead of a truck.

It will be readily understood that the arrangement for operation shown in Figs. 1, 2 and 3, and 4 is applicable to all the figures and is the preferred arrangement but that other methods of operation such as are commonly used with bascule bridges may be used if desired.

It will be understood that the mechanism shown in the figures in connection with plate girder spans are also applicable to truss bridges and vice versa.

Now having described my improvements, what I claim as my invention is:

1. The combination in a bascule bridge, of a movable span, pivotally connected at its heel to a fixed part of the bridge, a counterweight carrying structure pivotally connected to said span, a counterweight on the rearward end of said structure and a central support for said structure adapted to travel backward and forward on a substantially horizontal track, as said span rotates to its open and closed positions.

2. The combination in a bascule bridge, of a movable span pivotally connected at its heel to a fixed part of the bridge, a counterweight, a carrying structure for said counterweight pivotally connected to said span, a truck supporting said structure between said counterweight and said span, and adapted to travel backward and forward on a track as said span rotates, said track so shaped that said counterweight balances said span in all its positions.

3. The combination in a bascule bridge of a movable span pivotally connected at its heel to a fixed part of the bridge, a counterweight, a carrying structure for said counterweight pivotally connected to said span, a truck supporting said structure between said counterweight and said span and adapted to travel backward and forward on a substantially horizontal track and means to move said structure backward and forward and rotate said span to its open and closed positions.

4. In a bascule bridge, a movable span rotatably connected at its heel to a fixed part of the bridge structure, a traveling frame pivotally connected to said span and movable therewith, a counterweight carried on the rearward end of said frame, supporting means for said frame between said counterweight and said span, a substantially horizontal track for said supporting means and said track adapted to control the vertical motion of said counterweight to balance said span in all its positions.

5. In a bascule bridge, a movable span rotatably connected at its heel to a fixed part of the bridge structure, a traveling frame pivotally connected to said span and movable therewith, a counter weight carried on the rearward end of said frame, a truck supporting said frame between said counterweight and said span, a track for said truck adapted to control the vertical motion of said counterweight to balance said span in all its positions, and means to rotate said span to its open and closed positions.

6. In a bascule bridge, a movable span rotatably connected at its heel to a fixed part of the bridge structure, a traveling frame pivotally connected to said span and movable therewith, a counter weight carried on the rearward end of said frame, a truck supporting said frame between said counterweight and said span, a track for said truck adapted to control the vertical motion of said counterweight to balance said span in all its positions, and means to move said frame backward and forward and thereby rotate said span to its open and closed positions.

Signed at New York city, in the county of New York, and State of New York, this 31st day of July, A. D. 1917.

THOMAS ELLIS BROWN, Jr.

Witnesses:
Thos. E. Brown,
Rita Weiss.